Aug. 27, 1957 J. TURPIN 2,804,206
PROCESS FOR SEPARATING BY SIZE AND SPECIFIC GRAVITY
SOLID MATERIALS IN SUSPENSION IN A FLUID
Filed June 3, 1955 2 Sheets-Sheet 1

INVENTOR
JACQUES TURPIN

BY
*Adams & Bush*
ATTORNEYS

Aug. 27, 1957   J. TURPIN   2,804,206
PROCESS FOR SEPARATING BY SIZE AND SPECIFIC GRAVITY
SOLID MATERIALS IN SUSPENSION IN A FLUID
Filed June 3, 1955   2 Sheets-Sheet 2

INVENTOR
JACQUES TURPIN

BY
Adams & Bush
ATTORNEYS

United States Patent Office 2,804,206
Patented Aug. 27, 1957

2,804,206

PROCESS FOR SEPARATING BY SIZE AND SPECIFIC GRAVITY SOLID MATERIALS IN SUSPENSION IN A FLUID

Jacques Turpin, Fontainebleau, France, assignor to Préparation Industrielle des Combustibles, Fontainebleau, France, a French company Application June 3, 1955, Serial No. 513,045

Claims priority, application France June 3, 1954

5 Claims. (Cl. 209—211)

The present invention relates to processes for treating solid materials in suspension in a fluid and has more particular reference to a novel and improved process and apparatus for the separation, concentration and classing by size and specific gravity of solid materials in suspension in a fluid.

Known are systems used to separate solid materials of different specific gravity and different particle size, such materials being relatively small, for example, <10 mm. in the case of coal and refuse, employing cyclones fed with a mixture of the materials to be separated and a suspension in the water of very fine particles of a different product, the specific gravity of which is higher than that of the heaviest of the materials to be separated, or has a higher value than the "separating gravity" (the specific gravity of separation).

In these processes, the raw product being treated is separated into two fractions, one being discharged at the apex of the cyclone and the other at the opposite extremity. The solid products discharged at the apex have a higher specific gravity than a given value "$d$," while nearly all of those discharged at the end opposite the apex have a specific gravity lower than the said value "$d$." This value "$d$" has been called "separating gravity" (the specific gravity of separation).

In these known processes, a very finely crushed material is used to make the suspension. Also, the value of the "separating gravity" is greater than that of the specific gravity of the pseudo solution (suspension in water) with which the products to be separated are mixed. However, I have found by experiment that the accuracy of the separation increased when the difference existing between the specific gravity of the suspension and the separating specific gravity became smaller.

Also, it is known that the use of very finely crushed products to make the suspension presents drawbacks as far as the subsequent recovery of the crushed products is concerned. This recovery is generally effected either by means of clarification, accelerated or not by centrifugation, or magnetically, when the product used for the suspension is magnetic. In any case, it is well known that the exaggerated smallness of the product impedes simplicity and saving, as far as recovery of the product is concerned. Also, when using these known processes employing cyclones, there occurs a thickening effect of the suspension, caused by the conicity of the cyclones.

One object of the present invention is to provide a novel and improved process and apparatus for separation, concentration, and classing by size and specific gravity of solid materials in suspension in a fluid, in which the above pointed out drawbacks are remedied.

Another object of the present invention is to provide a novel and improved process and apparatus, as characterized above, which permits the use of, as the constituent of the suspension, a relatively granular solid product containing only 40% to 50% of products smaller than 40 microns.

A further object of the invention is to provide a novel and improved process and apparatus, as characterized above, in which the accuracy and efficiency of the separation is greatly increased.

Other objects and advantages of the invention will appear in the following specification when considered in connection with the accompanying drawings, wherein.

The present invention provides a novel and improved process and apparatus for the separation, concentration and classing by size and specific gravities of solid materials in suspension in a fluid.

In general, the process comprises mixing the raw product to be treated with a dense suspension and separating the products, by centrifugation of the suspension with the products mixed therewith, into two fractions; one a light fraction formed of particles all of a specific gravity less than a given value "$d$" (the predetermined specific gravity of separation) and the other a heavy fraction formed of particles all of a specific gravity greater than the said value "$d$" and maintaining the relationship between said value "$d$" and the specific gravity of the dense suspension such that said value "$d$," the separating gravity, will be equal to or less than the specific gravity of the suspension. The process further contemplates the use as the constituent of the suspension, a relatively granular solid product as, for example, magnetite containing only 40% to 50% of particles smaller than 40 microns.

The centrifugation is effected in one or more separating units, each comprising a pair of concentrically mounted tubular members. The product being treated, mixed with the suspension, are fed under pressure into the annular space between the concentric tubular members and move downwardly therethrough in a helical path within the annular space, whereby centrifugal action will separate the particles being treated into two fractions, one a light fraction formed of particles all of a specific gravity less than the specific gravity of separation, the other a heavy fraction formed of particles all of a specific gravity greater than the specific gravity of separation, the lighter fraction passing upward and out of the inner tubular member and the heavy fraction passing downwardly out of the open end of the outer tubular member.

Figure 1:
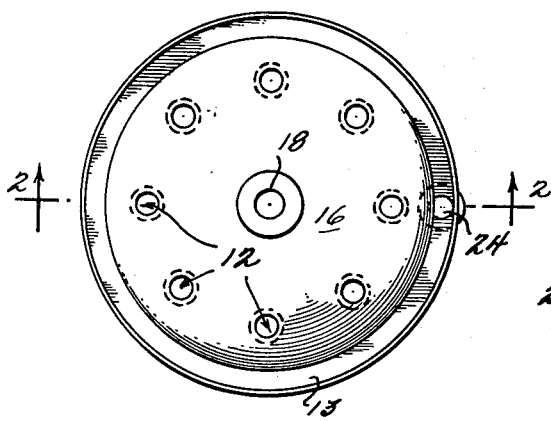
Fig. 1 is a top plan view of one embodiment of apparatus for carrying out the process of the present invention.
Figure 2:
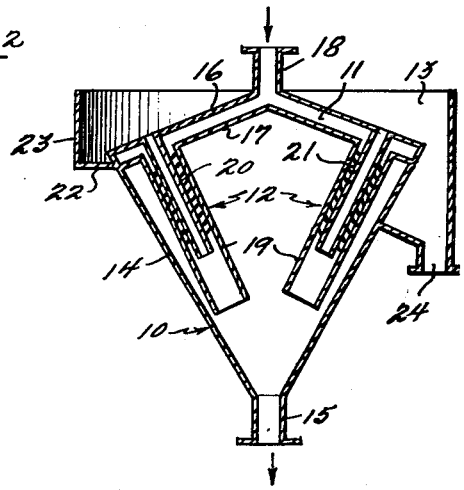
Fig. 2 is a sectional view of the device shown in Fig. 1, taken on the line 2—2.

Referring now to the drawings, there is illustrated, in Figs. 1 and 2, one embodiment of apparatus constructed in accordance with the present invention for carrying out the method thereof. As there shown, the apparatus comprises a container 10 having a plenum chamber 11 formed in its upper end portion, a plurality of separating units 12 mounted in the container; and an outlet chamber 13 mounted on the upper end of the container.

The container 10 is shown in the form of a hollow inverted conically shaped member 14 having an outlet conduit 15 formed in its lower end portion. The plenum chamber 11 is formed in the upper end portion of the container as by means of a vertically spaced pair of conically shaped wall forming members 16, 17 secured at their peripheries to the side wall of the container. An inlet conduit 18 is connected to the upper wall member 16 of the plenum chamber and positioned centrally thereof for admitting the fluid being treated, under pressure, into the plenum chamber.

Each of the separating units 12 is identical in construction and, as shown in Fig. 2, each comprises a pair of open-ended concentrically mounted tubular members; an outer cylindrical member 19 having its upper end connected to the bottom wall of the plenum chamber, with its bottom end terminating at a point adjacent the bottom of the container 10; an inner cylindrical member 20, of less diameter than the outer cylindrical member and concentrically mounted therein with its upper end extending through and connected to the top wall 16 of the plenum chamber, with its open bottom end portion extending a predetermined distance into the outer tubular member; and means for causing the suspension to travel downward in a spiral path in the annular space between the inner and outer tubular members, such as a helical baffle 21 which surrounds the inner cylindrical member 20.

The pairs of concentrically mounted tubular members are positioned in the container so that their longitudinal axes extend in a direction inclined from the vertical to facilitate the agglomeration of the dense particles under weight stresses. The pairs of tubular members are mounted in a circle and extend downwardly and inwardly in symmetrical relation to the vertical axis of the container, whereby the flow of the liquid travels the same distance and is submitted to the same deflections resulting in an equal separation of the volume of the fluid and the attainment of a perfect well balanced pressure between the separating units, as shown in Fig. 2.

The outlet chamber 13 is mounted on the top end portion of the container and is formed by an annular plate 22 having an upturned peripheral flange 23. The outlet chamber is provided with a suitable outlet, as shown at 24.

Figure 3:
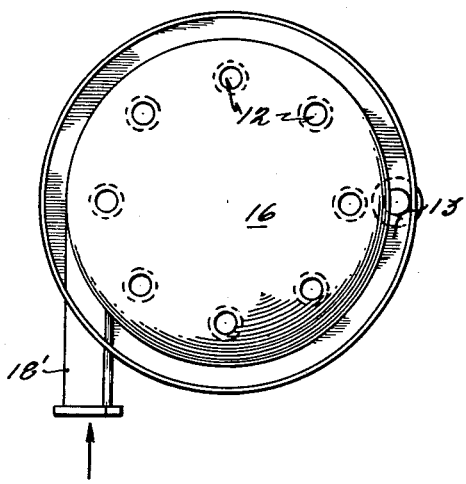
Fig. 3 is a top plan view of a modified form of apparatus.
Figure 4:
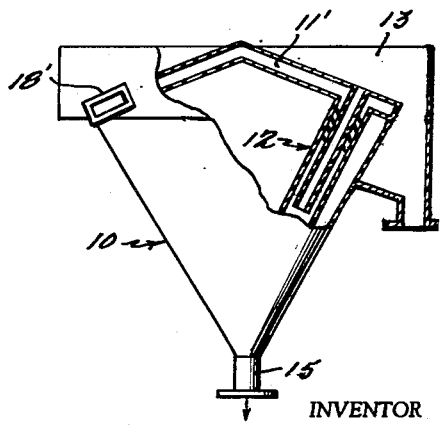
Fig. 4 is a side elevational view with parts broken away, of the apparatus shown in Fig. 3.

In Figs. 3 and 4, there is illustrated a modified form of apparatus in which the liquid is fed tangentially into the plenum chamber so as to produce a circular movement of the product, equalizing the pressure during the introduction of the fluid into all of the separating units. In this particular modification, the container 10, with its outlet conduit 15, the separating units 12, and the outlet chamber 13 are identical in construction to the corresponding members shown in Figs. 1 and 2. The plenum chamber 11' is identical in construction to the plenum chamber 11 of the apparatus shown in Figs. 1 and 2, except that the inlet conduit 18' connected thereto comes into the chamber in a lateral direction and at one side thereof, so that the fluid will be tangentially introduced into the chamber.

Figure 5:
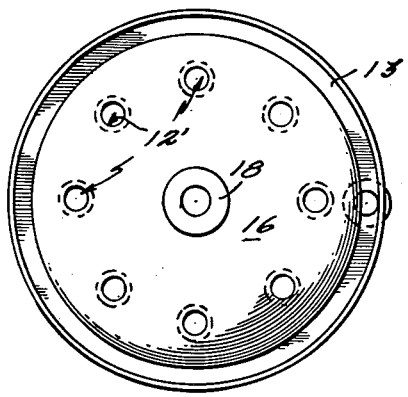
Fig. 5 is a top plan view of another modified form of apparatus.
Figure 6:
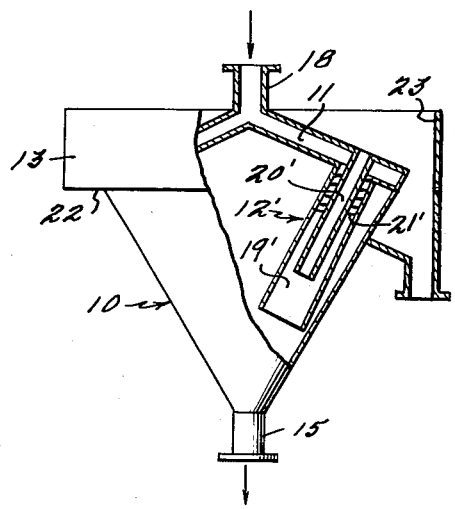
Fig. 6 is a side elevational view, with parts broken away, of the apparatus shown in Fig. 5.

In Figs. 5 and 6, there is illustrated another modified form of apparatus. In this particular modification, the container 10, with its outlet conduit 15, the plenum chamber 11 with its inlet conduit 18, and the outlet chamber 13 are identical in construction to the corresponding members shown in Figs. 1 and 2. However, in this particular modification, the separating units 12' are each formed by an inner cylindrical member 20' and an outer frusto-conical member 19', both tubular members being concentrically mounted about an axis inclined to the vertical. Suitable means, such as a helical baffle 21' which surrounds the inner cylindrical member, are provided for causing the suspension to travel downwardly in a helical path in the annular space between the inner cylindrical member and outer frusto-conical member.

Figure 7:
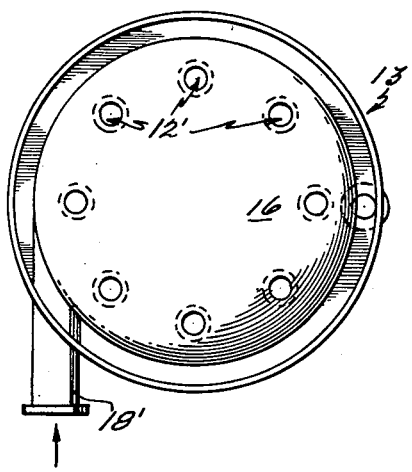
Fig. 7 is a top plan view of still another modified form of apparatus.
Figure 8:
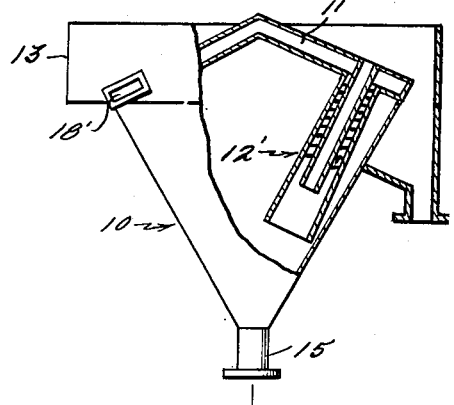
Fig. 8 is a side elevational view, with parts broken away, of the apparatus shown in Fig. 7.

In Figs. 7 and 8 there is illustrated still another modified form of apparatus in which the liquid is fed tangentially into the plenum chamber. In this particular modification, the container 10 with its outlet conduit 15, the separating units 12', and the outlet chamber 13 are identical in construction to the corresponding members shown in Figs. 5 and 6. The plenum chamber 11' is identical in construction to the plenum chamber 11 of the apparatus shown in Figs. 5 and 6, except that the inlet conduit 18' connected thereto comes into the chamber in a lateral direction and at one side thereof, so that the fluid will be tangentially introduced into the chamber.

The various modifications of apparatus hereinabove described may be effectively used to carry out the process of the invention to separate, by centrifugation, a mixture of solid materials of different specific gravities and different particle size into two fractions, one a light fraction formed of particles all of a specific gravity less than a given value "$d$," the other fraction formed of particles all of a specific gravity greater than the given value "$d$." the value "$d$" being called "separating value" (the specific gravity of separation).

In carrying out the process of the invention, the product to be treated, consisting of particles of different specific gravity and particle size, a part of the particles being of a specific gravity higher than a predetermined value "$d$" (the specific gravity of separation) and the remainder of the particles being of a specific gravity less than the said value "$d$," is mixed with a pseudo-solution or dense suspension made up to have a specific gravity equal to or greater than the said value "$d$." Then, the dense suspension, with the product to be treated mixed therewith, is fed under pressure into the plenum chamber of the apparatus, from which it travels downwardly in a spiral or helical path through the annular spaces between the tubular members forming the separating units, whereby the centrifugal action will separate the product into two fractions, one a light fraction formed of particles all of a specific gravity less than the said value "$d$" and the other a heavy fraction formed of particles all of a specific gravity greater than the value "$d$." The heavy fraction being discharged at the bottoms of the annular spaces into the container and the lighter fraction at the tops of the inner cylinders of the separating units into the outlet chamber.

The apparatus and process of the invention enables the accuracy of the separation to be increased as the separating units of the apparatus eliminate any thickening of the suspension encountered when the usual cyclones are employed. Also, more granular particles may be employed as a constituent of the dense suspension. For example, when magnetite is employed, it may contain only 40% to 50% of particles smaller than 40 microns.

While in the various embodiments of the apparatus herein disclosed, the separation units have been shown and described as being mounted in the container with their longitudinal axis extending in a direction inclined to the vertical, in so far as the process of the invention is concerned, the separating units may be mounted in the container so that their longitudinal axis extends in a vertical direction.

Obviously, the invention is not restricted to the various embodiments thereof herein shown and described.

What is claimed is:

1. In the process of treating raw products containing solid particles of various sizes and specific gravities involving mixing the raw product with a dense suspension and separating the product by centrifugation of the dense suspension with the product mixed therewith into two fractions, one a light fraction formed of particles all of a specific gravity less than the specific gravity of separation and the other a heavy fraction formed of particles all of a specific gravity greater than the specific gravity of separation, the improvement which comprises forming the suspension with solid granular products having only 40% to 50% smaller than 40 microns and maintaining the relationship between the specific gravity of separation and the specific gravity of the dense suspension such that the specific gravity of separation will be equal to or less than the specific gravity of the suspension.

2. A continuous process of separating by centrifugation a mass of solid particles, a portion of the mass of particles being of a specific gravity higher than a given value "d," said value "d" being a predetermined specific gravity of separation, and the remaining particles of the mass being of a specific gravity less than said value "d," comprising making up a dense suspension with solid granular products having only 40% to 50% smaller than 40 microns, mixing the mass of solid particles with the suspension; continuously feeding under pressure the dense suspension with the solid particles therewith into the upper end of an elongated helical passageway having its bottom end opening into a circular passageway; forcing the suspension to move downwardly in the helical passageway so that centrifugal action will causes the separation of the solid particles being treated into two fractions, one a light fraction formed of substantially all of the particles of a specific gravity less than said value "d," the other a heavy fraction formed of substantially all of the particles of a specific gravity greater than said value "d"; continuously discharging the separated heavy fraction from the bottom end of the helical passageway into and through the circular passageway connected thereto; continuously discharging the light fraction from the bottom of the helical passageway upwardly through a circular passageway formed within and extending coaxially with the helical passageway; and maintaining the relationship between said value "d" and the specific gravity of the dense suspension such that said value "d" will be equal to or less than the specific gravity of the suspension.

3. The process as set forth in claim 2, wherein the solid granular products employed in forming the suspension are magnetite.

4. The continuous process of separating solid particles of different specific gravities and particle size comprising mixing the product to be treated with a dense suspension made up of solid granular products having only 40% to 50% smaller than 40 microns; continuously introducing the dense suspension mixed with the product to be treated under pressure into a plenum chamber; feeding the mixture from the plenum chamber into a plurality of elongated helical passageways extending downwardly from the plenum chamber with each helical passageway opening into a circular passageway communicating with a common receptacle; moving the mixture downwardly in each helical passageway so that centrifugal force will cause the separation of the product being treated into two fractions, one a light fraction formed of substantially all of the particles of a specific gravity less than the specific gravity of separation, the other a heavy fraction formed of substantially all of the particles of a specific gravity greater than the specific gravity of separation; continuous discharging the separated heavy fraction from each helical passageway through the circular passageway connected therewith into the common receptacle; continuously discharging the light fraction from each helical passageway upwardly through a circular passageway formed therein and extending coaxially with the helical passageway and passing through the plenum chamber into a chamber for receiving the light fraction; and continuously maintaining the relationship between the specific gravity of separation and the specific gravity of the dense suspension such that the specific gravity of separation will be equal to or less than the specific gravity of the suspension.

5. The process as set forth in claim 4, wherein the solid granular products employed in forming the suspension are magnetite.

References Cited in the file of this patent
UNITED STATES PATENTS

| 2,543,689 | Driessen et al. | Feb. 27, 1951 |
| 2,738,070 | Cottrell | May 13, 1956 |

FOREIGN PATENTS

| 62,334 | France (2nd Addition) | Jan. 12, 1955 |
| 1,016,696 | France | Sept. 3, 1952 |

OTHER REFERENCES

Quarterly of the Colorado School of Mines, January 1948, volume 43, Number 1, page 22.